(12) United States Patent
Yamamoto et al.

(10) Patent No.: US 11,520,085 B2
(45) Date of Patent: Dec. 6, 2022

(54) TRANSPARENT SUBSTRATE

(71) Applicant: AGC Inc., Chiyoda-ku (JP)

(72) Inventors: Aya Yamamoto, Tokyo (JP); Yusuke Kobayashi, Tokyo (JP); Yoshitaka Saijo, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 406 days.

(21) Appl. No.: 16/697,323

(22) Filed: Nov. 27, 2019

(65) Prior Publication Data

US 2020/0096681 A1 Mar. 26, 2020

Related U.S. Application Data

(63) Continuation of application No. PCT/JP2018/011763, filed on Mar. 23, 2018.

(30) Foreign Application Priority Data

Jun. 15, 2017 (JP) .............................. JP2017-118114

(51) Int. Cl.
G02B 5/02 (2006.01)
C03C 19/00 (2006.01)
(Continued)

(52) U.S. Cl.
CPC ............ *G02B 5/0294* (2013.01); *C03C 15/00* (2013.01); *C03C 19/00* (2013.01); *G02B 1/11* (2013.01); *G02B 5/02* (2013.01)

(58) Field of Classification Search
CPC ............. C03C 19/00; B32B 3/00–3/30; G02B 5/021–5/0231; G02B 1/00–1/18
See application file for complete search history.

(56) References Cited

U.S. PATENT DOCUMENTS

2012/0134025 A1* 5/2012 Hart ........................ C03C 19/00
428/141
2017/0285227 A1 10/2017 Chen et al.

FOREIGN PATENT DOCUMENTS

WO WO-2016005216 A1 * 1/2016 ............. C03C 15/00
WO WO 2016/069113 A1 5/2016

OTHER PUBLICATIONS

Written opinion of co-pending JP 2019-525104. Retrieved Mar. 21, 2022.*

(Continued)

*Primary Examiner* — Prashant J Khatri
(74) *Attorney, Agent, or Firm* — Oblon, McClelland, Maier & Neustadt, L.L.P.

(57) ABSTRACT

A transparent substrate having an antiglare function includes first and second faces. The transparent substrate has a resolution index value T, a reflected image diffusivity index value R, and a sparkle index value S satisfying $T \geq 0.25$, $R \geq 0.8$, and $0.75 \leq S \leq 0.95$, respectively. The resolution index value T is calculated as (luminance of zero-degrees transmission light)/(luminance of total transmission light). The reflected image diffusivity index value R is calculated as $(R_2+R_3)/(2 \times R_1)$, where $R_1$ denotes a luminance of reflected light reflected at first angle $\alpha_1$, and $R_2$, $R_3$ denote luminance of reflected light at the second angle $\alpha_2$, the third angle $\alpha_3$, respectively, with respect to the first angle $\alpha_1$. The sparkle index value S is calculated as $1-(S_a/S_s)$, where the first sparkle $S_a$ and the second sparkle $S_s$ denote a sparkle value of the transparent substrate and a sparkle value of a glass substrate, respectively.

9 Claims, 2 Drawing Sheets

(51) Int. Cl.
G02B 1/11 (2015.01)
C03C 15/00 (2006.01)

(56) References Cited

OTHER PUBLICATIONS

Written Opinion dated Jun. 12, 2018 in PCT/JP2018/011763 filed on Mar. 23, 2018.

* cited by examiner

TRANSPARENT SUBSTRATE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2018/011763 filed on Mar. 23, 2018 and designating the U.S., which claims priority of Japanese Patent Application No. 2017-118114 filed on Jun. 15, 2017. The entire contents of the foregoing applications are incorporated herein by reference.

BACKGROUND OF THE INVENTION

1. Field of the Invention

The present invention relates to a transparent substrate, and more particularly to a transparent substrate having an antiglare function.

2. Description of the Related Art

In a display apparatus such as a smartphone or a personal computer, when a user sees a display screen, a reflection of a surrounding image often occurs. When such a reflection occurs on the display screen, the user who sees the display screen may have difficulty in visually recognizing the displayed image or may feel unpleasant.

Therefore, in order to reduce such reflection, a transparent substrate having an antiglare function is often provided on the display screen.

However, when an image displayed through a transparent substrate having an antiglare function is seen, the image may become unclear or the display screen may flicker (the user may feel flickering).

In particular, recently, the resolution of the image displayed on the screen of the display apparatus has been improved, and such problems of unclearness and sparkle of the images are expected to become more prominent in the future.

SUMMARY OF THE INVENTION

According to as aspect of the present invention, a transparent substrate having an antiglare function includes:
first and second faces,
wherein the transparent substrate has a resolution index value T, a reflected image diffusivity index value R, and a sparkle index value S satisfying:
$T \geq 0.25$,
$R \geq 0.8$, and
$0.75 \leq S \leq 0.95$,
wherein, for measurement of the resolution index value T, first light is emitted to the first face of the transparent substrate in a direction parallel with a thickness direction of the transparent substrate,
a luminance of zero-degrees transmission light is measured, the zero-degrees transmission light being transmission light exiting from the second face in a direction parallel with the thickness direction of the transparent substrate,
a luminance of total transmission light is measured, the total transmission light being transmission light having passed through the transparent substrate and exiting from the second face at an angle within a range of −30 degrees to +30 degrees with respect to the direction parallel with the thickness direction of the transparent substrate, and
the resolution index value T is calculated as:

resolution index value $T$=(luminance of zero-degrees transmission light)/(luminance of total transmission light), wherein, for measurement of the reflected image diffusivity index value R, second light is emitted to the first face of the transparent substrate at an angle inclined by +5.7 degrees with respect to a normal to the first face,
a luminance $R_1$ of first reflected light regularly reflected by the first face at a first angle $\alpha_1$ of −5.7 degrees±0.1 degrees with respect to the normal is measured,
a luminance $R_2$ of second reflected light reflected by the first face at a second angle $\alpha_2$ of −0.5 degrees±0.1 degrees with respect to the first angle $\alpha_1$ is measured,
a luminance $R_3$ of third reflected light reflected by the first face at a third angle $\alpha_3$ of +0.5 degrees±0.1 degrees with respect to the first angle $\alpha_1$ is measured, and
the reflected image diffusivity index value R is calculated as:

reflected image diffusivity index value $R=(R_2+R_3)/(2 \times R_1)$ wherein, for measurement of the sparkle index value S, the transparent substrate is placed over a display surface of a display apparatus with the second face facing the display apparatus,
with the display apparatus turned on, a sparkle value of the transparent substrate is measured as a first sparkle $S_a$ by using an analysis device SMS-1000,
a glass substrate of VRD140 glass having a thickness of 1.6 mm is placed over the display surface of the display apparatus,
with the display apparatus turned on, a sparkle value of the glass substrate is measured as a second sparkle $S_s$ by using the analysis device SMS-1000, and the sparkle index value S is calculated as:

sparkle index value $S=1-(S_a/S_s)$.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

Other objects and further features of an embodiment will become apparent from the following detailed description when read in conjunction with the accompanying drawings, in which.

DETAILED DESCRIPTION OF THE PREFERRED EMBODIMENTS

Hereinafter, an embodiment of the present invention will be explained with reference to the drawings.

(Transparent Substrate According to Embodiment of the Present Invention)

Figure 1:
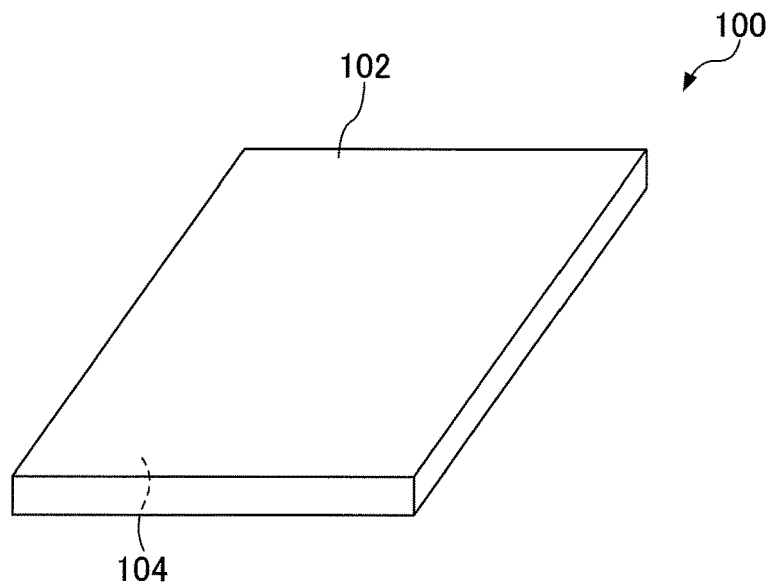
FIG. 1 is a schematic perspective view illustrating a transparent substrate according to the embodiment of the present invention.

FIG. 1 illustrates a schematic perspective view of a transparent substrate according to the embodiment of the present invention (hereinafter simply referred to as "transparent substrate").

As illustrated in FIG. 1, the transparent substrate 100 has a substantially rectangular shape and includes a first face 102 and a second face 104 opposite to each other.

In the present invention, the form and shape of the transparent substrate 100 are not particularly limited. The transparent substrate 100 may have, for example, a plate shape, a thin film shape, or a film shape. In a case where the transparent substrate 100 is a thin film or a film, the transparent substrate 100 may be installed on any given support member. In addition to the rectangular shape, the transparent substrate 100 may have, for example, a circular shape, an elliptical shape, or a roll shape.

The transparent substrate 100 may be made of any material as long as it is transparent. The transparent substrate 100 may be made of, for example, glass or resin.

When the transparent substrate 100 is made of glass, the composition of the glass is not particularly limited. The glass may be, for example, soda lime glass or aluminosilicate glass.

When the transparent substrate is made of glass, at least one of the first face and the second face may be treated with chemical strengthening treatment.

Here, the chemical strengthening treatment refers to a general term of a technique for immersing the glass substrate in the molten salt including alkali metal, and replacing alkali metals (ions) having a small ionic radius present on the outermost surface of the glass substrate with alkali metals (ions) having a large ionic radius in the molten salt. In the chemical strengthening treatment, alkali metals (ions) having an ionic radius larger than that of the original atoms are disposed on the surface of the treated glass substrate. For this reason, compressive stress can be applied to the surface of the glass substrate, thereby improving the strength (particularly crack strength) of the glass substrate.

The thickness of the transparent substrate 100 varies depending on the purpose, but is, for example, in the range of 0.1 mm to 5 mm. In particular, when the transparent substrate 100 is used in a display apparatus, the thickness of the transparent substrate 100 is preferably 2 mm or less.

The transparent substrate 100 is applied as, for example, a cover glass or a touch panel of a display apparatus. The display apparatus may be, for example, a television device, a computer, a tablet terminal, a smartphone, a mobile phone, an electronic blackboard, and the like.

Here, the transparent substrate 100 has the following characteristics.

(i) resolution index value T is 0.25 or more,
(ii) reflected image diffusivity index value R is 0.8 or more,
(iii) sparkle index value S is 0.75 or more and 0.95 or less.

The resolution index value T is an index relating to the sharpness of the image that is transmitted through the transparent substrate. The higher the resolution index value T is, the higher the sharpness of the image is. The reflected image diffusivity index value R is an index relating to the degree of reflection of the surrounding image on the transparent substrate, i.e., the antiglare property. The higher the reflected image diffusivity index value R is, the more greatly the reflection is suppressed, and the higher the antiglare property of the transparent substrate is. The sparkle index value S is an index related to the unevenness of bright spots, i.e., sparkle, caused by the light scattered by the transparent substrate and interfering with each other when the light (image) from the display apparatus passes through the transparent substrate. The lower the sparkle index value S is, the more prominent the sparkle is.

As described above, when an image from a display apparatus is visually seen through a transparent substrate having a conventional antiglare function, the image often becomes unclear and the display screen may sparkle.

However, with the transparent substrate 100 satisfying the above characteristics (i) to (iii), a suitable antiglare effect can be obtained, and the sparkle of the screen and the unclearness of the visually recognized image can be significantly suppressed. In particular, with the transparent substrate 100, it is expected that unclearness of the image and occurrence of sparkle can be significantly suppressed even if the resolution of the image displayed on the screen in the display apparatus is improved in the future.

In general, as the value of the reflected image diffusivity index value R increases, the sparkle index value S tends to increase. The resolution index value T tends to decrease as these index values increase. Therefore, it is very difficult to increase all of the index values. When the transparent substrate 100 is used for cover glass of a display apparatus and the like, it is usually preferable that the resolution index value T is 0.8 or more, but through the studies conducted by the inventors of the present application, it has been discovered that, in a case where the transparent substrate 100 is directly bonded to the display panel of the display apparatus with resin, keeping the reflected image diffusivity index value R and the sparkle index value S at a high level even if the resolution index value T is kept to about 0.25 to 0.7 will result in a cover glass capable of obtaining clear images while improving sparkle suppression effect and antiglare effect.

(Measuring Method of Three Index Values)

Here, a method for measuring the above-described three index values, i.e., the resolution index value T, the reflected image diffusivity index value R, and the sparkle index value S, will be explained with reference to drawings.

(Resolution Index Value T)

First, the measurement method of resolution index value T will be explained with reference to FIG. 2.

Figure 2:
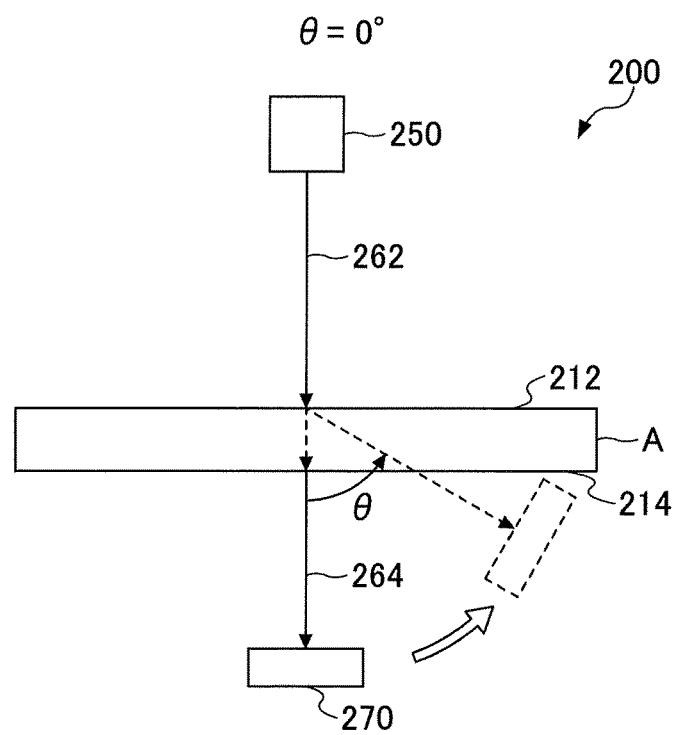
FIG. 2 is a drawing schematically illustrating an example of a measurement apparatus used to measure a resolution index value T of the transparent substrate.

FIG. 2 schematically illustrates an example of a measurement apparatus used to measure the resolution index value T.

As illustrated in FIG. 2, the measurement apparatus 200 includes a light source 250 and a detector 270. A sample to be measured, i.e., a transparent substrate A, is placed in the measurement apparatus 200. The transparent substrate A has a first face 212 and a second face 214. The light source 250 emits first light 262 toward the transparent substrate A. The detector 270 receives the transmission light 264 exiting from the transparent substrate A and detects its luminance.

The transparent substrate A is placed so that the first face 212 is at the side of the light source 250 and the second face 214 is at the side of the detector 270. Therefore, the light detected by the detector 270 is the transmission light 264 having been transmitted through the transparent substrate A.

When one of the faces of the transparent substrate A is antiglare treated, the antiglare treated face serves as the first face 212 of the transparent substrate A. That is, in this case, the transparent substrate A is placed in the measurement apparatus 200 such that the antiglare-treated surface is at the side of the light source 250.

During measurement, the first light 262 is emitted from the light source 250 toward the transparent substrate A. The first light 262 is emitted in a direction substantially parallel with a normal to the first face 212 (and the normal to the second face 214) of the transparent substrate A. Hereinafter, this angle θ is defined as the direction of zero degrees. Since the actual measurement includes error, the angle θ more precisely includes the range of zero degrees±0.5 degrees.

Subsequently, using the detector 270, the luminance of the transmission light 264 being transmitted at an angle θ of zero degrees (hereinafter also referred to as "zero-degrees transmission light") is measured at the second face 214 of the transparent substrate A.

Next, the angle θ at which the detector 270 receives the transmission light 264 is changed by 1 degree in the range of −30 degrees to +30 degrees, and a similar operation is performed. Here, a minus (−) sign indicates that the angle θ is inclined counterclockwise with respect to the normal to the second face 214, and a plus (+) sign indicates that the angle θ is inclined clockwise with respect to the normal to the second face 214.

As a result, the luminance of the transmission light 264 exiting from the second face 214 through the transparent substrate A at the angle θ of −30 degrees to +30 degrees (hereinafter also referred to as "total transmission light") is measured using the detector 270.

Next, the resolution index value T is calculated from the following Expression (1).

resolution index value $T$=(luminance of zero-degrees transmission light)/(luminance of total transmission light)   Expression (1)

It has been confirmed that the resolution index value T obtained by such measurement is correlated with a result of visual judgement on a resolution by an observer, and exhibits a behavior similar to visual perception by a person. For example, a transparent substrate exhibiting a low resolution index value T (close to 0) has a poor resolution. On the other hand, a transparent substrate exhibiting a high (close to 1) resolution index value T has a high resolution. Therefore, this resolution index value T can be used as a quantitative index when judging the resolution of the transparent substrate.

Such a measurement can be easily performed by using a commercially available goniometer (a goniophotometer).

(Reflected Image Diffusivity Index Value R)

Next, a method for measuring the reflected image diffusivity index value R of the transparent substrate will be explained with reference to FIG. 3.

Figure 3:
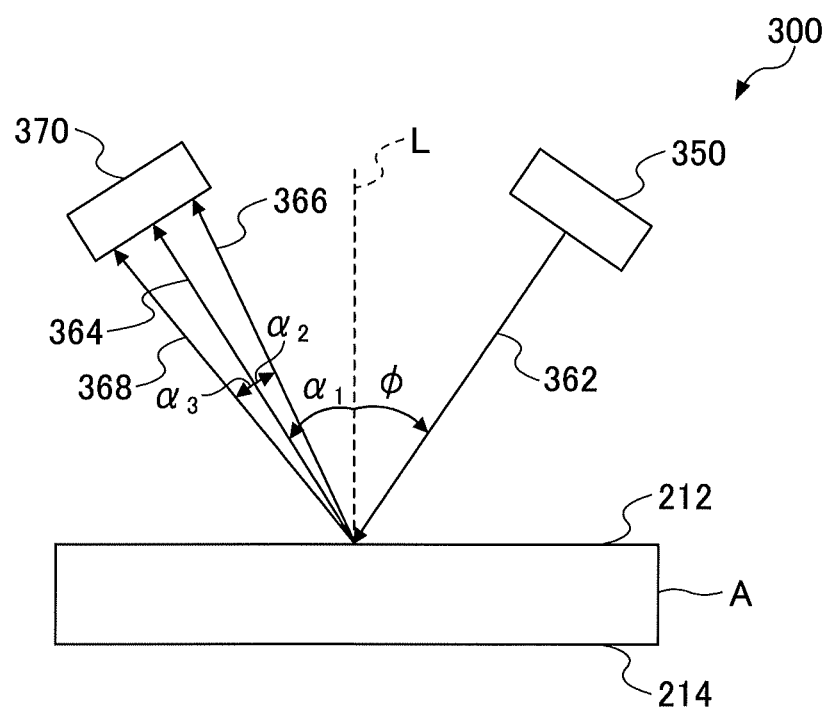
FIG. 3 is a drawing schematically illustrating an example of a measurement apparatus used to measure a reflected image diffusivity index value R of the transparent substrate.

FIG. 3 illustrates an example of a measurement apparatus used to measure the reflected image diffusivity index value R.

As illustrated in FIG. 3, the measurement apparatus 300 includes a light source 350 and a detector 370. A sample to be measured, i.e., a transparent substrate A, is placed in the measurement apparatus 300. The transparent substrate A includes a first face 212 and a second face 214. The light source 350 emits a slit-like second light 362 having a width of 101 mm toward the transparent substrate A. The detector 370 receives the reflected light reflected by the first face 212 at a predetermined angle, and detects its luminance.

It should be noted that the transparent substrate A is arranged so that the first face 212 is at the side of the light source 350 and the detector 370. Therefore, the light detected by the detector 370 is reflected light reflected by the transparent substrate A. Also, in a case where one of the faces of the transparent substrate A is antiglare treated, this antiglare treated face serves as the first face 212 of the transparent substrate A. More specifically, in this case, the transparent substrate A is placed in the measurement apparatus 300 such that the antiglare treated surface is at the side of the light source 350 and the detector 370.

During measurement, the second light 362 is emitted from the light source 350 of the measurement apparatus 300 toward the transparent substrate A.

The second light 362 is emitted to the transparent substrate A at an angle φ inclined by 5.7 degrees clockwise with respect to the normal L to the transparent substrate A. Since the actual measurement includes error, the angle φ more precisely includes the range of 5.7 degrees±0.1 degrees.

Next, a luminance $R_1$ of light regularly reflected (i.e., reflected by regular reflection) by the first face 212 of the transparent substrate A (hereinafter referred to as "first reflected light 364") is measured using the detector 370.

Actually, the angle of the first reflected light 364 (first angle $\alpha_1$) with respect to the normal L is −φ ($\alpha_1$=−φ). Therefore, the first angle $\alpha_1$ is −5.7 degrees±0.1 degrees. A minus (−) sign indicates that the angle is inclined counterclockwise with respect to the normal line, and a plus (+) sign indicates that the angle is inclined clockwise with respect to the normal line.

However, since the first angle $\alpha_1$ of the first reflected light 364 is used as a reference here, the first angle $\alpha_1$ is defined as 0 degrees±0.1 degrees.

Likewise, a luminance $R_2$ of reflected light reflected by the first face 212 of the transparent substrate A at a second angle $\alpha_2$ (hereinafter referred to as "second reflected light 366") and a luminance $R_3$ of reflected light reflected by the first face 212 of the transparent substrate A at a third angle $\alpha_3$ (hereinafter referred to as "third reflected light 368") are measured. Here, the second angle $\alpha_2$ is −0.5 degrees±0.1 degrees with respect to the first angle $\alpha_1$. The third angle $\alpha_3$ is +0.5 degrees±0.1 degrees with respect to the first angle $\alpha_1$.

The reflected image diffusivity index value R of the transparent substrate A is calculated by the following Expression (2) using the obtained luminance $R_1$, $R_2$, $R_3$.

Reflected image diffusivity index value $R=(R_2+R_3)/(2\times R_1)$   Expression (2)

It has been confirmed that the reflected image diffusivity index value R is correlated with a result of visual judgement on a reflected image diffusivity by an observer, and exhibits a behavior similar to visual perception by a person. For example, a transparent substrate exhibiting a high reflected image diffusivity index value R (a value close to 1) tends to be excellent in the reflected image diffusivity. On the other hand, a transparent substrate exhibiting a low reflected image diffusivity index value R tends to be inferior in the reflected image diffusivity.

Such a measurement can be performed, for example, by using an analysis device SMS-1000 manufactured by Display-Messtechnik & Systeme GmbH & Co. KG.

When this device is used, a C1614A lens with a focal length of 16 mm is used at an aperture of 5.6. The distance from the first face 212 of the transparent substrate A to the camera lens is about 300 mm, and the Imaging Scale is set in the range of 0.0276 to 0.0278.

(Sparkle Index Value S)

Next, a method for measuring the sparkle index value S of the transparent substrate will be explained.

When the sparkle index value S is measured, first, a display apparatus (iPad (registered trademark), resolution: 64 ppi) is prepared. The display surface of the display apparatus may have a cover for the purpose of damage prevention.

Next, a sample to be measured, i.e., a transparent substrate, is placed on the display surface of the display apparatus. When one of the faces of the transparent substrate A is antiglare treated, the transparent substrate A is placed on the display surface of the display apparatus with the antiglare treated surface facing the display apparatus.

Next, with the display apparatus turned on and the image displayed, the analysis device (SMS-1000 manufactured by Display-Messtechnik & Systeme GmbH & Co. KG) is used to analyze the degree of sparkle of the transparent substrate. As a result, a sparkle $S_a$ expressed as sparkle value is obtained.

The image displayed on the display apparatus is a single green image composed of RGB (0, 255, 0), and is preferably displayed on the entire display screen of the display apparatus. This is to minimize the influence of differences in appearance due to differences in display colors. The distance d between the fixed imaging device and the transparent substrate is configured to be 540 mm. This distance d corresponds to r=10.8 when expressed by a distance index r.

Next, a similar measurement is performed on the reference sample. The reference sample is a glass substrate (VRD140 glass manufactured by Asahi Glass Europe) having a thickness of 1.6 mm.

The sparkle value obtained is adopted as a sparkle $S_s$.

From the obtained $S_a$ and $S_s$, the sparkle index value S of the transparent substrate A is calculated by the following Expression (3).

$$\text{Sparkle index value } S=1-(S_a/S_s) \quad \text{Expression (3)}$$

It has been confirmed that this sparkle index value S is correlated with a result of visual judgement on sparkle by an observer, and exhibits a behavior similar to visual perception by a person. For example, a transparent substrate having a low sparkle index value S tends to have significant sparkles. On the contrary, a transparent substrate having a high sparkle index value S tends to have suppressed sparkles.

In this measurement, a 23FM50SP lens with a focal length of 50 mm is preferably used at an aperture of 5.6.

(Other Features of Transparent Substrate According to Embodiment of the Present Invention)

Next, other features of the transparent substrate 100 will be explained. It should be noted that the following features are given as necessary, and are not essential features in the present invention.

(Hardness)

At least one of the faces of the transparent substrate 100 according to the embodiment of the present invention may have a pencil hardness of more than 6H. In this case, the transparent substrate 100 is hardly scratched.

Here, the pencil hardness of the transparent substrate is measured by a method specified in JIS K5400 using a pencil hardness meter.

(Haze)

The transparent substrate 100 according to the embodiment of the present invention may have a haze of 40 or less.

In general, when a cover glass is installed on the surface of a display apparatus with a black peripheral frame, the color difference between the central part and the frame part often becomes conspicuous, and the black frame may not look good.

However, in a case where the transparent substrate has a haze of 40 or less, even if the transparent substrate is installed on the surface of such a display apparatus, the difference in color becomes inconspicuous, and deterioration in aesthetics can be suppressed.

Here, the haze of the transparent substrate is measured using a haze meter by the method specified in JIS K-7136.

(Finger Slipperiness and Pen Slipperiness)

The transparent substrate 100 according to the embodiment of the present invention may have a finger kinetic coefficient of friction of 0.4 or less. Alternatively or additionally, the transparent substrate 100 according to the embodiment of the present invention may have a pen static coefficient of friction in a range of 0.18 to 0.3.

In a case where the transparent substrate is used as a touch panel that can be operated with fingers, good finger slipperiness is desired. In addition, in a case where the transparent substrate is used as a touch panel that can be operated with a pen, good pen slipperiness is desired. Otherwise, the user feels uncomfortable when trying to perform various operations with the fingers or the touch pen on the touch panel.

In this regard, in a case where the transparent substrate 100 according to the embodiment of the present invention has the above-mentioned finger kinetic coefficient of friction, and the transparent substrate 100 is applied as a touch panel, the user can feel a good finger slipperiness having both of moderate slipperiness and catching feeling.

In addition, in a case where the transparent substrate 100 according to the embodiment of the present invention has the above-mentioned pen static coefficient of friction, the user can obtain a good writing comfort with little catching feeling when the transparent substrate 100 is applied as a touch panel.

To obtain the "finger kinetic coefficient of friction", a tactile contact simulating the shape of a finger is linearly moved on the surface to be measured with a load of 30 g and at a speed of 100 mm/s, and an average value of kinetic coefficient of frictions obtained when a moving distance is in a range of 15 mm to 35 mm is adopted as the "finger kinetic coefficient of friction".

The measurement is performed in an environment where the temperature is 23 degrees Celsius±2 degrees Celsius and the humidity is 50%±10%.

On the other hand, to obtain the "pen static coefficient of friction", a predetermined pen is moved linearly on the surface to be measured with a load of 200 g and at a speed of 100 mm/s in a 45 degrees tilted state with respect to the normal of the surface to be measured (tilt angle of 45 degrees), and an obtained static coefficient of friction is adopted as the "pen static coefficient of friction". The predetermined pen is assumed to have a polyacetal core (ACK-2001 manufactured by Wacom Co., Ltd.). The moving direction is a direction perpendicular to the plane including the normal and the predetermined pen. The measurement is performed in an environment where the temperature is 23 degrees Celsius±2 degrees Celsius and the humidity is 50%±10%.

(Method for Manufacturing Transparent Substrate According to Embodiment of the Present Invention)

The transparent substrate 100 according to the embodiment of the present invention having the above-described features may be manufactured by any manufacturing method.

For example, the transparent substrate 100 may be manufactured by wet-etching a glass substrate. In this method, the transparent substrate 100 having the above-described characteristics can be easily obtained by using, for example, a mixed solution including hydrofluoric acid, sulfuric acid, and ammonium fluoride as an etchant.

Alternatively, the transparent substrate 100 may be manufactured by sandblasting a glass substrate and thereafter wet-etching the glass substrate.

In the case of this method, for example, the transparent substrate 100 having the above-described characteristics can be easily obtained by using abrasive grains of small grain sizes in the sandblasting process (for example, a granularity of #2000 or more).

EXAMPLES

Next, examples of the present invention will be explained. In the following description, Examples 1 to 6 are examples according to the embodiment, and Examples 7 to 16 are comparative examples.

Example 1

A transparent substrate having an antiglare function was prepared by the following method.

First, a glass substrate with a thickness of 0.56 mm was prepared. The glass substrate was composed of aluminosilicate glass and was not treated with chemical strengthening treatment.

Next, this glass substrate was wet-etched. The wet etching was performed by bringing the etchant into contact with only one of the faces (first face) of the glass substrate. The etchant was a mixed solution of hydrofluoric acid, sulfuric acid, and ammonium fluoride. The etching depth was 5 μm (target value).

As a result, a transparent substrate (hereinafter referred to as "Sample 1") having an antiglare function was obtained.

Example 2

A transparent substrate having an antiglare function was prepared by the following method.

First, a glass substrate with a thickness of 0.71 mm was prepared. The glass substrate was composed of aluminosilicate glass and was not treated with chemical strengthening treatment.

Next, sandblasting was performed on one of the faces (first face) of the glass substrate. White alumina particles (#2000) were used as the abrasive grains, and the pressure was 0.5 MPa.

Next, the first face of the glass substrate was selectively wet-etched. The etchant was a hydrofluoric acid solution. The etching depth was 32 μm (target value).

As a result, a transparent substrate (hereinafter referred to as "Sample 2") having an antiglare function was obtained.

Example 3

A transparent substrate having an antiglare function was prepared in a manner similar to that of Example 2. However, in Example 3, sand blasting was performed using white alumina particles (#3000) as abrasive grains. The etching depth was 24 μm (target value). Other conditions were similar to those in Example 2.

As a result, a transparent substrate (hereinafter referred to as "Sample 3") having an antiglare function was obtained.

Example 4

A transparent substrate having an antiglare function was prepared in a manner similar to that of Example 2. However, in this Example 4, sand blasting was performed using white alumina particles (#3000) as the abrasive grains at a pressure of 0.4 MPa. Other conditions were similar to those in Example 2.

As a result, a transparent substrate (hereinafter referred to as "Sample 4") having an antiglare function was obtained.

Example 5

A transparent substrate having an antiglare function was prepared in a manner similar to that of Example 4. In Example 5, however, the sandblasting was performed at a pressure of 0.5 MPa. Other conditions were similar to those in Example 4.

As a result, a transparent substrate (hereinafter referred to as "Sample 5") having an antiglare function was obtained.

Example 6

A transparent substrate having an antiglare function was prepared in a manner similar to that of Example 4. However, in this Example 6, sandblasting was performed at a pressure of 0.4 MPa. The etching depth was 16 μm (target value). Other conditions were similar to those in Example 4.

As a result, a transparent substrate (hereinafter referred to as "Sample 6") having an antiglare function was obtained.

Example 7

A commercially available transparent resin film (manufactured by Kimoto Co., Ltd.) having a thickness of 0.13 mm was prepared, and this was designated as "Sample 7".

Example 8

A transparent substrate having an antiglare function was prepared by the following method.

First, a glass substrate with a thickness of 0.70 mm was prepared. The glass substrate was made of soda lime glass, and was not treated with chemical strengthening treatment.

Next, this glass substrate was wet etched. The wet etching was performed by bringing the etchant into contact with only one of the faces (first face) of the glass substrate. The etchant was a mixed solution of hydrofluoric acid, sulfuric acid, and ammonium fluoride. The etching depth was 5 μm (target value).

As a result, a transparent substrate (hereinafter referred to as "Sample 8") having an antiglare function was obtained.

Example 9

A transparent substrate having an antiglare function was prepared in a manner similar to that of Example 8. However, in this Example 9, the etching depth was 5 μm (target value). Other conditions were similar to those in Example 8.

As a result, a transparent substrate (hereinafter referred to as "Sample 9") having an antiglare function was obtained.

Example 10

A transparent substrate having an antiglare function was prepared in a manner similar to that of Example 8. However, in Example 10, a mixed solution with a higher concentration of sulfuric acid than that in the mixed solution of Example 8 was used as the etchant. Other conditions were similar to those in Example 8.

As a result, a transparent substrate (hereinafter referred to as "Sample 10") having an antiglare function was obtained.

Example 11

A transparent substrate having an antiglare function was prepared in a manner similar to that of Example 8. However, in Example 11, a mixed solution including hydrofluoric acid and ammonium fluoride was used as the etchant. Other conditions were similar to those in Example 8.

As a result, a transparent substrate (hereinafter referred to as "Sample 11") having an antiglare function was obtained.

Example 12

A transparent substrate having an antiglare function was prepared in a manner similar to that of Example 8. However, in this Example 12, a mixed solution with a higher concentration of hydrofluoric acid than that in the mixed solution of Example 8 was used as the etchant. Other conditions were similar to those in Example 8.

As a result, a transparent substrate (hereinafter referred to as "Sample 12") having an antiglare function was obtained.

Example 13

A transparent substrate having an antiglare function was prepared by the following method.

First, a glass substrate with a thickness of 0.63 mm was prepared. The glass substrate was composed of aluminosilicate glass and was not treated with chemical strengthening treatment.

Next, sandblasting was performed on one of the faces (first face) of the glass substrate. White alumina particles (#600) were used for the abrasive grains, and the pressure was 0.5 MPa. White alumina particles (#600) were used as the abrasive grains, and the pressure was 0.5 MPa.

Next, the first face of the glass substrate was selectively wet etched. The etchant was a hydrofluoric acid solution. The etching depth was 32 µm (target value).

As a result, a transparent substrate (hereinafter referred to as "Sample 13") having an antiglare function was obtained.

Example 14

A transparent substrate having an antiglare function was prepared in a manner similar to that of Example 13. However, in this Example 14, sand blasting was performed using white alumina particles (#1000) as the abrasive grains. Other conditions were similar to those in Example 13.

As a result, a transparent substrate (hereinafter referred to as "Sample 14") having an antiglare function was obtained.

Example 15

A transparent substrate having an antiglare function was prepared in a manner similar to that of Example 13. However, in this Example 15, the etching depth was 96 µm (target value). Other conditions were similar to those in Example 13.

As a result, a transparent substrate (hereinafter referred to as "Sample 15") having an antiglare function was obtained.

Example 16

A commercially available glass substrate (Matelax manufactured by Asahi Glass Co., Ltd.) having a thickness of 4.7 mm was prepared, and this was designated as "Sample 16".

(Evaluation)

Using samples 1 to 16 obtained by the method described above, the resolution index value T, the reflected image diffusivity index value R, and the sparkle index value S were evaluated by the method described above.

Table 1 below summarizes the result obtained for each sample.

TABLE 1

| EXAMPLE | THICKNESS (mm) | RESOLUTION INDEX VALUE T | REFLECTED IMAGE DIFFUSIVITY INDEX VALUE R | SPARKLE INDEX VALUE S |
|---|---|---|---|---|
| 1 | 0.56 | 0.395 | 0.963 | 0.780 |
| 2 | 0.71 | 0.308 | 0.933 | 0.851 |
| 3 | 0.54 | 0.490 | 0.976 | 0.802 |
| 4 | 0.67 | 0.546 | 0.833 | 0.776 |
| 5 | 0.67 | 0.472 | 0.879 | 0.794 |
| 6 | 0.70 | 0.441 | 0.959 | 0.868 |
| 7 | 0.13 | 0.912 | 0.120 | 0.760 |
| 8 | 0.70 | 0.277 | 0.975 | 0.718 |
| 9 | 0.70 | 0.842 | 0.388 | 0.398 |
| 10 | 1.90 | 0.901 | 0.280 | 0.132 |
| 11 | 0.70 | 0.182 | 0.951 | 0.777 |
| 12 | 0.55 | 0.548 | 0.838 | 0.512 |
| 13 | 0.63 | 0.053 | 0.953 | 0.966 |
| 14 | 0.67 | 0.094 | 0.970 | 0.969 |
| 15 | 0.61 | 0.630 | 0.689 | 0.581 |
| 16 | 4.70 | 0.040 | 1.000 | 0.970 |

It was found from Table 1 that, in Samples 1 to 6, the resolution index value T, the reflected image diffusivity index value R, and the sparkle index value S satisfied the conditions (i) to (iii), respectively, described above.

On the other hand, it was found that, in Samples 7 to 16, at least one of the resolution index value T, the reflected image diffusivity index value R, and the sparkle index value S did not satisfy the above conditions (i) to (iii).

Next, evaluations of hardness, haze, finger slipperiness, and pen slipperiness were performed using Samples 1 to 6.

The method of measuring these items was as described above.

For the measurement of the hardness, a pencil hardness tester (Heidon manufactured by Shinto Kagaku Co., Ltd.) was used. For the measurement of the haze, a haze meter (NDH-7000 manufactured by Nippon Denshoku Industries Co., Ltd.) was used.

In the evaluation of finger slipperiness, a tactile contact (manufactured by Trinity-Lab inc.) was used in place of a finger, and the measurement was performed using a static and dynamic friction measuring device (TL201Ts manufactured by Trinity Lab inc.).

For one sample, the measurement was performed three times at different positions, and the average of these values was adopted as a "finger kinetic coefficient of friction". Before and after the sample measurement, a similar measurement was performed using a float plate as a reference, and it was confirmed that the value of the kinetic coefficient of friction of the float plate was in an appropriate range.

On the other hand, in the evaluation of the pen slipperiness, a polyacetal core pen (ACK-2001; manufactured by Wacom Co., Ltd.) was used, and the measurement was performed using a static and dynamic friction measuring device (TL201Ts manufactured by Trinity-Lab inc.).

For one sample, the measurement was performed three times at different positions, and the average of these values was adopted as a "pen static coefficient of friction". Before and after the sample measurement, a similar measurement was performed using the float plate as a reference, and it was confirmed that the value of the static coefficient of friction of the float plate was in an appropriate range.

Table 2 below summarizes the measurement results obtained.

TABLE 2

| EXAMPLE | PENCIL HARDNESS | HAZE | FINGER KINETIC COEFFICIENT OF FRICTION | PEN STATIC COEFFICIENT OF FRICTION |
|---|---|---|---|---|
| 1 | 9H | 29.6 | 0.40 | 0.20 |
| 2 | 9H | 46.7 | 0.28 | 0.16 |
| 3 | 9H | 33.0 | 0.36 | 0.23 |
| 4 | 9H | 28.1 | 0.29 | 0.22 |
| 5 | 9H | 31.2 | 0.34 | 0.16 |
| 6 | 9H | 49.8 | 0.31 | — |

According to an aspect of the embodiment, a transparent substrate capable of suppressing sparkle on the screen and unclearness of the image without significantly impairing the antiglare function is provided.

Although the preferred embodiment and examples of the present invention have been described in detail above, the present invention is not limited to the embodiment and examples described above, and various modifications and substitutions can be applied to the embodiment and examples described above without departing from the scope of the present invention.

What is claimed is:

1. A transparent substrate having an antiglare function, comprising:
first and second faces,
wherein the transparent substrate has a resolution index value T, a reflected image diffusivity index value R, and a sparkle index value S satisfying:
T≥0.25,
R≥0.9, and
0.8≤S≤0.95,
wherein, for measurement of the resolution index value T, first light is emitted to the first face of the transparent substrate in a direction parallel with a thickness direction of the transparent substrate,
a luminance of zero-degrees transmission light is measured, the zero-degrees transmission light being transmission light exiting from the second face in a direction parallel with the thickness direction of the transparent substrate,
a luminance of total transmission light is measured, the total transmission light being transmission light having passed through the transparent substrate and exiting from the second face at an angle within a range of −30 degrees to +30 degrees with respect to the direction parallel with the thickness direction of the transparent substrate, and the resolution index value T is calculated as:

resolution index value $T$=(luminance of zero-degrees transmission light)/(luminance of total transmission light), wherein, for measurement of the reflected image diffusivity index value R, second light is emitted to the first face of the transparent substrate at an angle inclined by +5.7 degrees with respect to a normal to the first face,
a luminance $R_1$ of first reflected light regularly reflected by the first face at a first angle $\alpha_1$ of −5.7 degrees±0.1 degrees with respect to the normal is measured,
a luminance $R_2$ of second reflected light reflected by the first face at a second angle $\alpha_2$ of −0.5 degrees±0.1 degrees with respect to the first angle $\alpha_1$ is measured,
a luminance $R_3$ of third reflected light reflected by the first face at a third angle $\alpha_3$ of +0.5 degrees±0.1 degrees with respect to the first angle $\alpha_1$ is measured, and
the reflected image diffusivity index value R is calculated as:

reflected image diffusivity index value $R=(R_2+R_3)/(2\times R_1)$, wherein, for measurement of the sparkle index value S, the transparent substrate is placed over a display surface of a display apparatus with the second face facing the display apparatus,
with the display apparatus turned on, a sparkle value of the transparent substrate is measured as a first sparkle $S_a$ by using an analysis device SMS-1000,
a glass substrate of VRD140 glass having a thickness of 1.6 mm is placed over the display surface of the display apparatus,
with the display apparatus turned on, a sparkle value of the glass substrate is measured as a second sparkle $S_s$ by using the analysis device SMS-1000, and
the sparkle index value S is calculated as:

Sparkle index value $S=1-(S_a/S_s)$.

2. The transparent substrate according to claim 1, wherein the sparkle index value S is 0.84≤S≤0.95.

3. The transparent substrate according to claim 1, wherein the reflected image diffusivity index value R is 0.92 or more.

4. The transparent substrate according to claim 1, wherein a pencil hardness is more than 6H.

5. The transparent substrate according to claim 1, wherein a haze value is less than 40.

6. The transparent substrate according to claim 1, wherein a finger kinetic coefficient of friction is 0.4 or less.

7. The transparent substrate according to claim 1, wherein a pen static coefficient of friction is 0.18 or more and 0.3 or less.

8. The transparent substrate according to claim 1, wherein the transparent substrate is constituted by glass having a thickness of 2 mm or less.

9. The transparent substrate according to claim 8, wherein the transparent substrate is constituted by glass having a thickness of 1.3 mm or less.

* * * * *